(12) United States Patent  
Moore et al.

(10) Patent No.: US 6,925,601 B2  
(45) Date of Patent: Aug. 2, 2005

(54) ADAPTIVE TESTING AND TRAINING TOOL

(75) Inventors: Gilbert Moore, Oregon House, CA (US); J. Wesley Cleveland, Oregon House, CA (US); Vilnis E. Vulfs, Nevada City, CA (US); Diane Carter, Gainsville, FL (US); Francis Cahill, Oregon House, CA (US); William Heinz, Oregon House, CA (US)

(73) Assignee: Kelly Properties, Inc., Troy, MI (US)

( * ) Notice: Subject to any disclaimer, the term of this patent is extended or adjusted under 35 U.S.C. 154(b) by 88 days.

(21) Appl. No.: 10/230,311

(22) Filed: Aug. 28, 2002

(65) Prior Publication Data

US 2004/0041829 A1 Mar. 4, 2004

(51) Int. Cl.[7] .............................. G06F 3/00; G06F 3/14; G09B 3/00
(52) U.S. Cl. ...................... 715/707; 715/811; 434/118; 434/238; 434/353; 434/362
(58) Field of Search .................................. 345/707, 811, 345/812; 434/118, 219, 238, 322, 323, 356, 353, 362; 463/7, 9, 23

(56) References Cited

U.S. PATENT DOCUMENTS

| | | | | |
|---|---|---|---|---|
| 5,259,766 A | * | 11/1993 | Sack et al. | 434/362 |
| 5,597,312 A | * | 1/1997 | Bloom et al. | 434/362 |
| 5,879,165 A | * | 3/1999 | Brunkow et al. | 434/322 |
| 5,957,699 A | * | 9/1999 | Peterson et al. | 434/350 |
| 6,471,521 B1 | * | 10/2002 | Dornbush et al. | 434/322 |
| 6,501,937 B1 | * | 12/2002 | Ho et al. | 434/362 |
| 6,519,445 B2 | * | 2/2003 | Casey-Cholakis et al. | 434/350 |
| 6,606,479 B2 | * | 8/2003 | Cook et al. | 434/350 |
| 6,606,480 B1 | * | 8/2003 | L'Allier et al. | 434/362 |

* cited by examiner

Primary Examiner—X. L. Bautista  
(74) Attorney, Agent, or Firm—Harness, Dickey & Pierce, P.L.C.

(57) ABSTRACT

An adaptive training system for use with an adaptive testing tool includes a user interface receptive of a field of application selection from a user. A plurality of task items are stored in a data store. The plurality of task items are organized by field of application and ranked by difficulty level. An adaptive item selector selects unfamiliar task items as training items based on the selected field of application and a user ability. These training items range in order of difficulty from items slightly below a user's ability to items sufficiently far above that level to allow for learning effects. The user ability is a function of previous user performance on an adaptive test in the selected field of application. The main purpose of the adaptive item selector is to ensure that training items are neither too easy nor too difficult for a person.

45 Claims, 4 Drawing Sheets

ADAPTIVE TESTING AND TRAINING TOOL

FIELD OF THE INVENTION

The present invention generally relates to adaptive testing systems and particularly relates to automated training systems for use with a computerized adaptive testing (CAT) tool.

BACKGROUND OF THE INVENTION

The challenges of evaluating and training individuals has led to many developments over the years, and computer automated testing and training has become the norm in many fields. The field of academics has proven to be one fertile ground for development of computer automated testing and training, and training for standardized examinations with practice tests and questions is only one example application area. Professional training has proven to be another fertile ground for development of computer automated training, and such training proves particularly useful in professions that primarily require computer interfacing skills.

Skills evaluation is related to training because assessing an individual's skills before training the individual assists a training tool in focusing on an individual's training needs. In fact, one past solution to the challenge of training individuals has involved testing an individual's ability to perform tasks with a wide range of difficulty level, and then training them on the tasks they failed to perform correctly. The inefficiencies inherent in this approach were recognized nearly half a century ago. However, it was not until the advent of high-speed computers in the nineteen-seventies that Frederic Lord and others could construct a computer adaptive testing (CAT) alternative to mass, full-item testing. For more on this point, refer to Howard Wainer, *Computerized Adaptive Testing: A Primer* (Hillsdale, N.J. 1990), pp. 8–11.

With CAT, task items are ranked according to difficulty level and a computer selects task items for a user during an exam based on the user's performance during the exam. For example, if a user fails to perform a task of a certain difficulty level, then the computer selects a new task for the user with somewhat lower level of difficulty. Also, if the user succeeds in performing a task of a certain difficulty level, then the computer selects a new task for the user of a somewhat higher level of difficulty. This function is performed recursively until the computer determines a user's ability based on overall performance during the test, and the CAT system has advantages over previous skills assessment techniques.

A distinct advantage of the CAT system is the ability to evaluate a user's skill level with a fewer number of tasks, thereby saving significant amounts of time and effort. For example, performance of fifteen task items is sufficient with a CAT system compared with a requirement for performance of seventy-five task items with previous evaluation systems. Thus, CAT systems benefit from the ability to minimize the number of items required to measure accurately a person's ability. This advantage, however, has a tradeoff when combined with previous training techniques, because training users only on missed items following a CAT exam fails to provide adequate training.

Unsuitability of combining previous training procedures with a CAT system relates to the advantages of the CAT system. For example, this unsuitability relates to the ability of the CAT system to assess an individual's skill level with a fewer number of tasks. Unlike previous testing procedures, the CAT system generally results in a smaller number of missed items during an exam regardless of a user's skill level. Also, the unsuitability relates to the ability of the CAT system to rapidly converge on a person's ability level and thereby eliminate the need to test a user on tasks far below, or far above, their ability. As a result of the testing technique granting this ability, difficulty levels of missed items usually congregate at or near a particular level. Thus, training users only on missed items generally results in a small amount of training at or near a single level of difficulty.

Given the development and availability of the CAT skills assessment technique, the need arises for an adaptive training system and method for use with the CAT tool. Existing training methods, such as training users only on tasks they failed to perform correctly during the CAT test, fails to take into account the following: (1) The CAT test is not converging simply on items previously missed, but rather on items close to a trained person's higher measured ability level; (2) if training after one CAT test is effective, it will have a "Heisenberg" effect on the path taken by the next CAT, such that with his/her measured ability improved, the trained person will now experience a more difficult CAT test; and (3) it is only when the training has been ineffective that the second CAT will more or less duplicate the path of the first CAT. Thus, training users only on tasks they failed to perform correctly on a CAT test merely trains user's on a handful of tasks they are unlikely to encounter on a subsequent CAT exam. Such a training method also fails to focus on the goal of raising an individual's overall skill level. Therefore, the need remains for a solution to the challenge of training individuals based on an adaptive skills evaluation technique that focuses on raising overall skill level in a desired skill set. The present invention provides such a solution.

SUMMARY OF THE INVENTION

In accordance with the present invention, an adaptive training system for use with an adaptive testing tool includes a user interface receptive of a field of application selection from a user. A plurality of task items are stored in a data store. The plurality of task items are organized by field of application and ranked by difficulty level. An item selector selects an unfamiliar task item as a training task item based on the selected field of application and a user ability. The user ability is a function of previous user performance relating to task items of the selected field of application.

The training tool of the present invention is advantageous over previous training tools because it focuses on raising a person's overall ability level relating to a field of application. The present invention further benefits by using training task items that correspond to testing task items, wherein both testing task items and training task items permit a user to explore various alternative paths to performing the task. The primary difference between the training and testing task items is the addition of a "Show Me" button to the training task items that a user can elect to use at points of difficulty, such that the user is assisted in accomplishing the task only as needed. Task items can double as both training task items and testing task items, wherein the "Show Me" button is only active (displayed and/or selectable) during a training mode. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
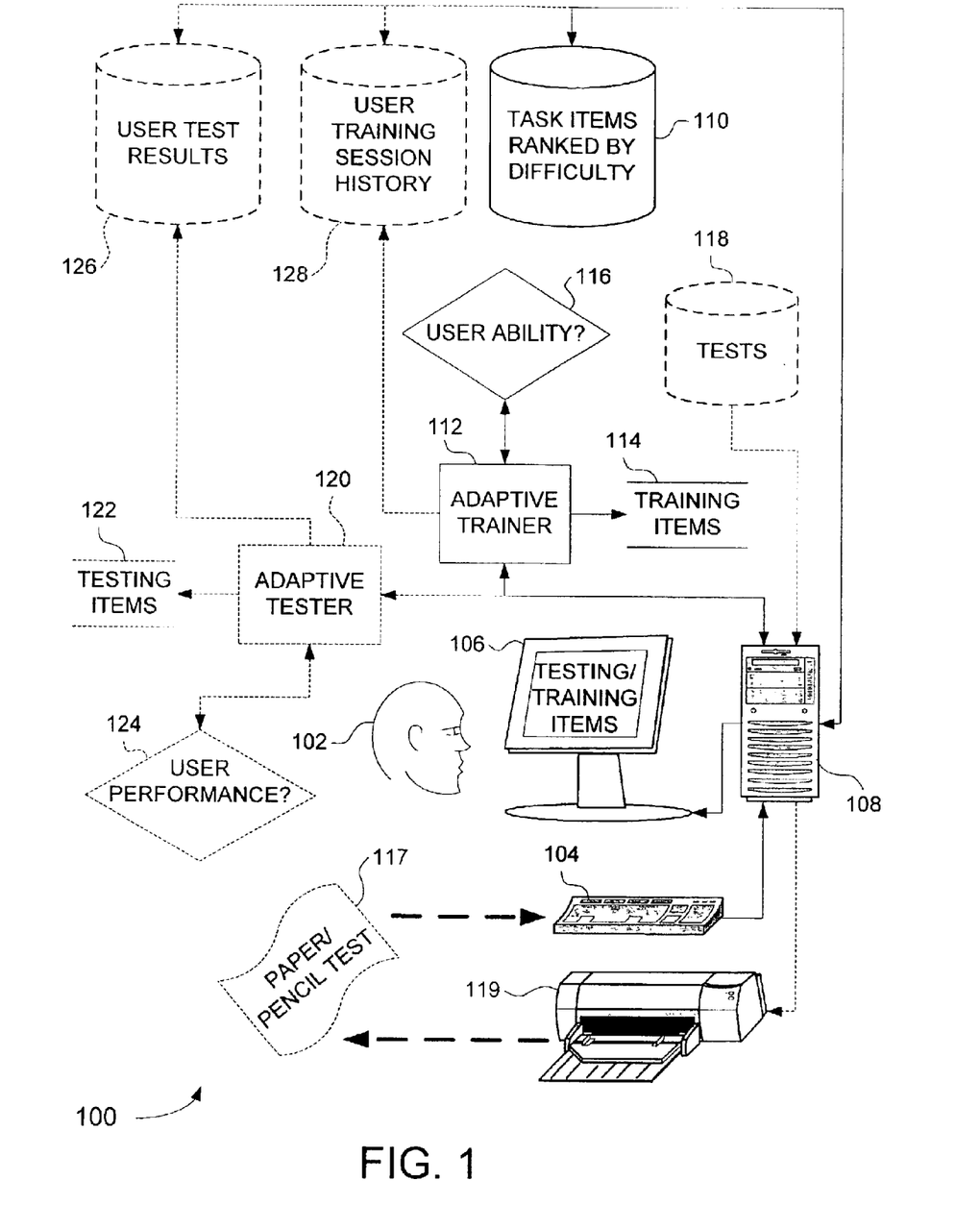
FIG. 1 is a partial-perspective, block diagram of an adaptive testing and training tool according to the present invention.

An adaptive testing and training tool 100 according to the present invention is illustrated in FIG. 1. Accordingly, a user 102 interacts with the tool 100 via a user interface including a user input 104, such as a computer keyboard, that is receptive of a field of application selection from the user 102. In a preferred embodiment, the user 102 can select a field of application by specifying one or more job titles, and a plurality of corresponding training categories appear for user selection. The user interface further includes a user output 106 such as an active display. Moreover, the tool 100 has computer hardware in tower box 108 providing a computer memory and running an operating system with software accomplishing the present invention. Essentially, the tool 100 has a plurality of task items 110 organized by field of application, ranked by difficulty level, and stored in memory operable with a data processing system. An adaptive training module 112 is operable to select unfamiliar task items as training task items 114 based on a selected field of application and a user ability 116. The adaptive training module 112 determines the user ability 116 as a function of previous user performance relating to task items 110 of the selected field of application.

There are alternative ways by which information relating to a previous user performance can be obtained by adaptive training module 112. For example, if the tool 100 has an adaptive testing module 120, then the testing module 120 can administer a CAT exam to the user with some of the task items 110. According to the CAT functionality, the testing module selects testing task items 122 for the user 102 based on user performance 124 during the exam. The test results 126 can then be automatically stored in computer memory for access by adaptive training module 112. A further alternative involves a user inputting printed results of a CAT exam.

A user can input results of a paper/pencil test 117 in one or more ways. Demonstratively, the user 102 could indicate a particular test of which the tool is aware, and check off tasks failed or tasks performed correctly on a GUI with checkboxes. The user can alternatively scan the results into a utility that does the checking automatically. The tool 100 can calculate the user ability 116 by having knowledge of the difficulty levels of the items on the test. Thus, in addition to being functional with a CAT system, the tool 100 may function to train individuals based on results of a test on many task items with a wide range of levels of difficulty. The tool may also be functional to print out such a test for skills evaluation in a field of application prior to training using test database 118 and printer 119. In such an embodiment, the test could be used during training to assess the user's progress. Alternatively, the tool 100 can electronically administer a test on many task items with a wide range of levels of difficulty and automatically store results 126. As a final alternative, a user can input printed results of a training session.

Figure 2:
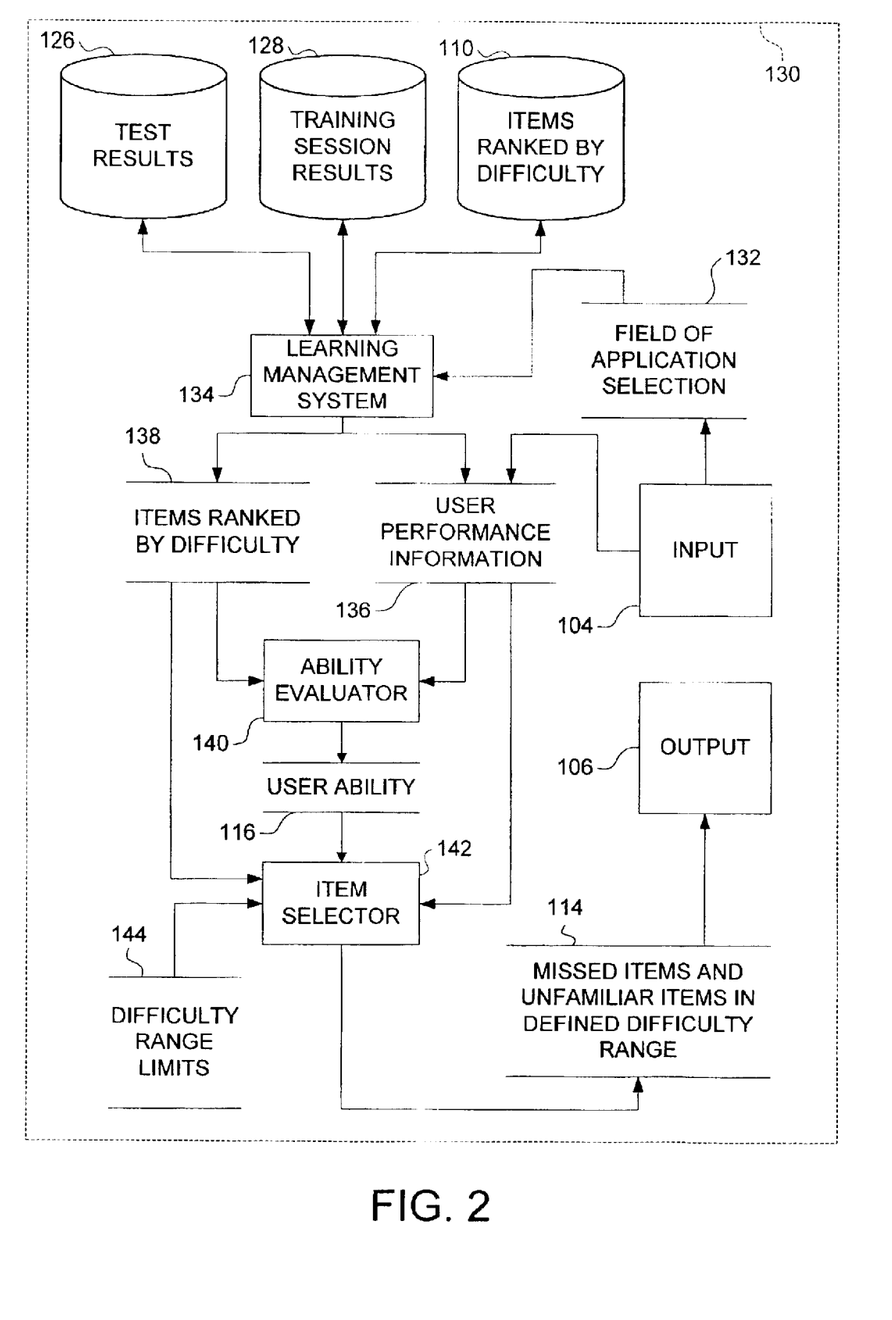
FIG. 2 is a block diagram of an adaptive training system according to the present invention.

Referring to FIG. 2, an adaptive training system 130 according to the present invention preferably has test results 126, training session results 128, and ranked and categorized task items 110 available in computer memory. In operation, user input 104 receives a field of application selection 132 from a user and communicates it to learning management system 134. In response, learning management system 134 accesses test results 126 and training session results 128 and retrieves user performance information 136 for the current user, and further accesses task items 110 and retrieves a list of category-specific items 138 ranked by difficulty that correspond to the selected category. As discussed previously, user input 104 can alternatively receive some or all of the user performance information from the user.

According to the preferred embodiment, the application specific items 138 and user performance information 136 are communicated to an ability evaluator 140 that computes the user ability 116 based on the difficulty levels of items previously performed correctly by the user. In turn, the application specific items 138 and user performance information 136, and user ability are communicated to an item selector 142. The item selector 142 selects as training task items 114 those items in the category that the user recently failed to perform correctly, and also several unfamiliar task items in the category that the user did not recently encounter. These unfamiliar items are selected from the application specific items 138 as a number of items having levels of difficulty that fall within a difficulty range, wherein the range is determined by the user ability and difficulty range limits 144. These difficulty range limits 144 generally take the form of an offset in difficulty above and/or below the user ability 116, and preferably are defined in terms of the units describing the user ability 116 and the difficulty level of the task items 110. Thus, where difficulty level of task items is described in terms of logit units as well known in the art of CAT systems, the user ability is preferably determined in terms of a logit level. Thus, the difficulty range limits preferably take the form of a predefined number of logits above and below the user ability. Selected training task items are communicated to user output 106.

Figure 3:
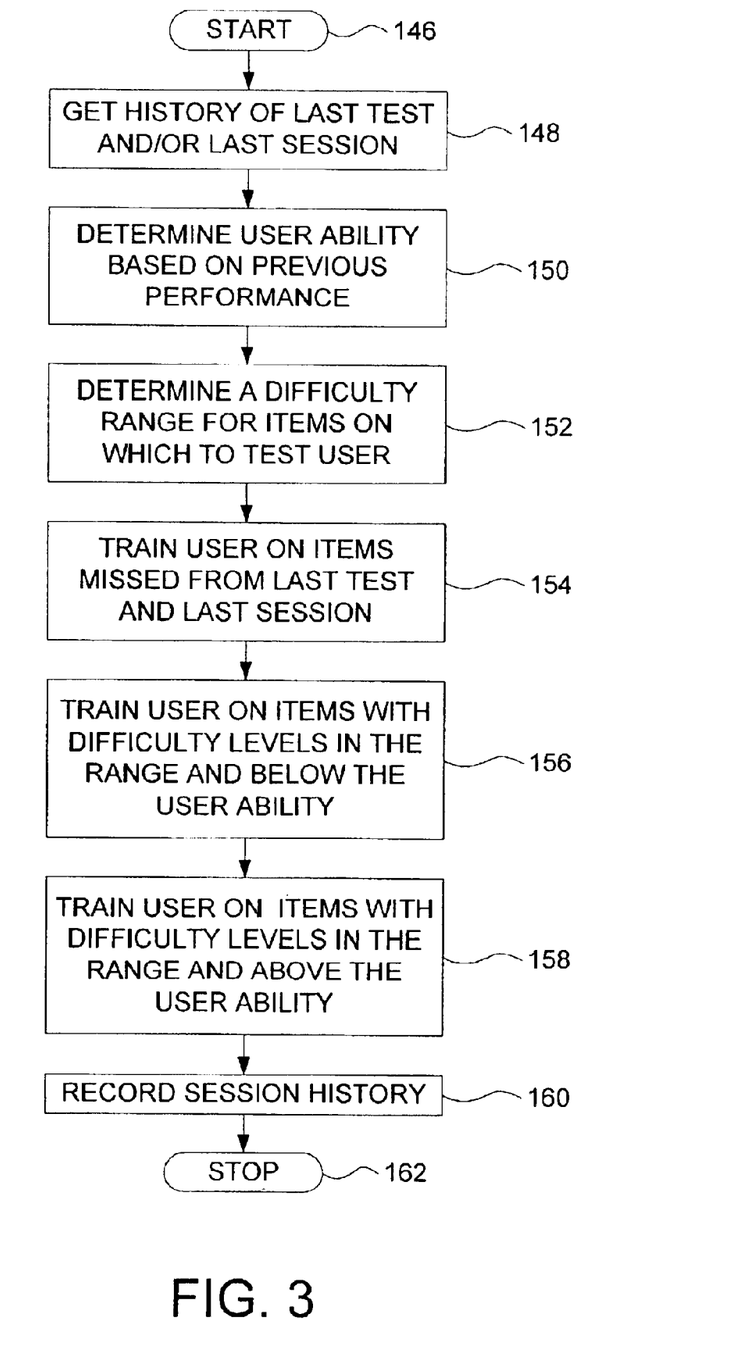
FIG. 3 is a flow chart diagram of an adaptive training method according to the present invention.

An adaptive training method according to the present invention is described with reference to FIG. 3. Beginning at 146, the method proceeds to step 148, wherein a history of a last test and/or last training session is retrieved. The method proceeds to step 150 where a user ability is determined based on the user performance, and then to step 152 where a difficulty range is determined based on the user ability. The method then proceeds to training the user by training the user on items missed on the last test and/or last session at step 154. Further, the method trains the user on unfamiliar task items not encountered in a last test and/or last session, by training the user on task items having difficulty levels in the range below the user ability at step 156, and by training the user on task items having difficulty levels in the range above the user ability at step 158. The method proceeds to step 160, wherein the session history is recorded, and ends at 162.

Figure 4:
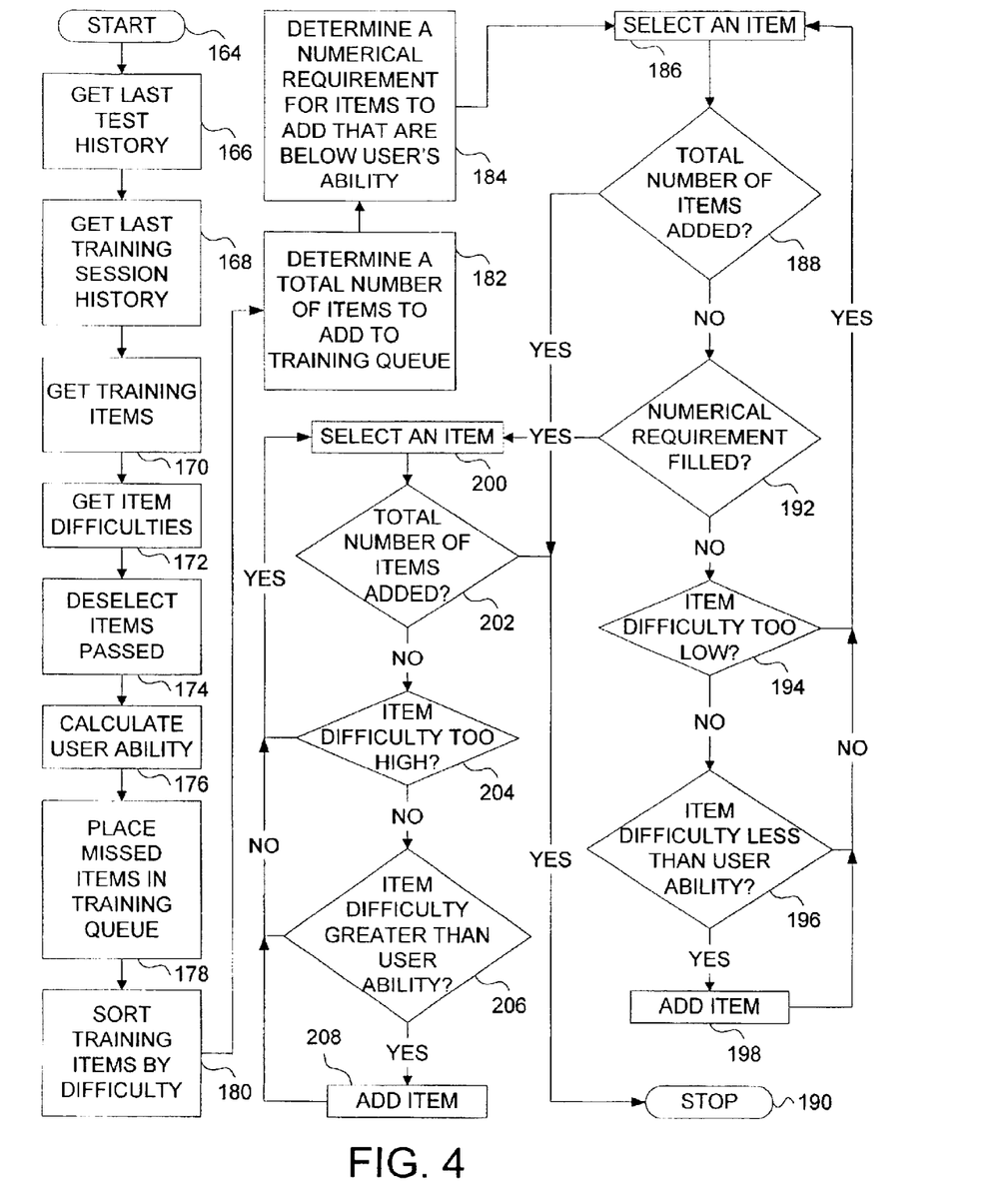
FIG. 4 is a detailed logic flow diagram for training item selection according to the present invention.

The detailed logic flow diagram of FIG. 4 demonstrates a computer automated process suitable for accomplishing the method of the present invention in a manner that may be implemented with the adaptive training system of the present invention. This process focuses on generating a queue of training items based on a user selected category for delivery to the user for training purposes. Accordingly, the process begins at 164 and proceeds to step 166, wherein the last test history for a selected category is retrieved. At step 168, the process retrieves the last training session history for the category, if any. The process then retrieves the list of application specific task items at step 170, and then proceeds to step 172 wherein item difficulties defined in terms of logits are retrieved. The process deselects passed items on the last test and last training session history at step 174, thus effectively making them unselectable. Then the process proceeds to step 176 and calculates the user ability $A_u$ in terms of logits as a sum of average difficulty level of task items performed correctly by the user, and a natural log of a quotient of a number of task items performed correctly by the user and a number of task items performed incorrectly by the user according to:

$$A_u = avg\_difficulty(items\_correct) + ln(items\_correct/items\_missed).$$

The process then proceeds to step 178, wherein items missed on the last test or during the last training session are placed in the training task item queue, and the selectable task items remaining in the list are sorted by difficulty level at step 180. At step 182, a total number of items to add to the training queue N is calculated as twenty minus the number of items missed according to:

$$N = 20\text{-items\_missed}.$$

The number 20 is chosen to ensure an adequate number of training items without overburdening the user, but may be modified without departing from the present invention. In an alternative embodiment, the total number is calculated as a function of user ability to ensure more training for users with lower ability levels and less training for users with higher ability levels. As a further alternative, distance of the user ability from a cut point used in the CAT exam to define user proficiency can be used to define or modify the total number. At step 184, a numerical requirement is determined for a total number of items to add that have a difficulty level below the user ability, such as, for example, twenty percent of the total number determined in step 182, and the process is ready to begin adding unfamiliar items to the training queue.

At step 186, the process selects an unfamiliar task item (one not passed on a previous test or training session) from the category-specific list of task items, and proceeds to 188, wherein it is determined if the total number of items to add has been reached. If so, the method ends at 190. Otherwise, a determination is made at 192 whether the numerical requirement for training items having difficulty levels below the user ability has been met. If not, the process checks whether the item difficulty is too low at 194, and a lower bound difficulty range limit of one logit is preferred. The process further checks whether the selected task item has a difficulty level below the user ability at 196. If the selected task item has a difficulty level below the user ability and is within the defined range, it is added to the training queue at step 198. Otherwise, a new item is selected at step 186 and processing continues from there. Steps 186 through 198 proceed recursively until the total number of items is added, in which case the process ends, or the numerical requirement is filled, in which case the process proceeds to step 200, wherein an unfamiliar task item (one not passed on a previous test or training session) from the category-specific list of task items is selected. The process then check whether the total number of items has been added at step 202, in which case the process ends at 198. If not, a determination is made at 204 as to whether the selected task item difficulty level is too high, and an upper bound difficulty range limit of two and one-half logits is preferred. The process further checks whether the difficulty level of the selected item is above the user ability. If the selected task item has a difficulty level above the user ability and is within the defined range, it is added to the training queue at step 208. Otherwise, a new item is selected at step 186 and processing continues from there. Steps 200 through 208 proceed recursively until the total number of items is added and the process ends at 190. Thus, a queue of training task items is generated and output (displayed) to the user for training purposes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An adaptive training system for use with an adaptive testing tool, the system comprising:
    a user interface receptive of a field of application selection from a user;
    a plurality of task items stored in a data store, the plurality of task items organized by field of application and ranked by difficulty level;
    an item selector operable to select an unfamiliar task item as a training task item based on the selected field of application and a user ability, wherein the user ability is a function of previous user performance relating to task items of the selected field of application; and
    an ability evaluation module operable to determine a level of user ability as a function of previous user performance relating to a plurality of task items, wherein the plurality of task items relate to the selected field of application, and said ability evaluation module is operable to compute the user ability as a sum of average difficulty level of task items previously performed correctly by the user and a natural log of a quotient of a number of task items performed correctly by the user and a number of task items performed incorrectly by the user.

2. The system of claim 1, wherein said item selector is operable to select an easier, unfamiliar task item having a difficulty level below the user ability, and a more difficult, unfamiliar task item having a difficulty level above the user ability.

3. The system of claim 1, wherein said item selector is operable to select a missed task item as a training task item.

4. The system of claim 1, wherein at least one cut point is defined in terms of user ability as an indicator of minimum user proficiency level relating to a field of application, and wherein said item selector is operable to vary a total number of selected training items based on a comparison between the user ability and the defined cut point.

5. The system of claim 1, wherein said user interface is receptive of user performance information corresponding to results of a paper and pencil test.

6. The system of claim 1 comprising previous training session results organized by user and stored in memory operable with a data processing system, wherein said item selector has a learning management system operable to access said previous training session results and retrieve user performance information.

7. The system of claim 1 comprising tests results organized by user and stored in memory operable with a data processing system, wherein said item selector has a learning management system operable to access said test results and retrieve user performance information.

8. The system of claim 1, wherein an unfamiliar training task item corresponds to a task item not selected as a testing task item in a last testing procedure.

9. The system of claim 1, wherein an unfamiliar training task item corresponds to a task item not selected as a training task item in a last training session.

10. The system of claim 1, wherein said item selector is operable to select as training task items a plurality of unfamiliar task items having difficulty levels in a predefined range of difficulty relating to the user ability, thereby selecting at least one unfamiliar task item having a difficulty level less than the user ability, and at least one unfamiliar task item having a difficulty level higher than the user ability.

11. The system of the claim 1, wherein difficulty level of task items is terms of logits, and wherein said item selector is operable to select unfamiliar task items in a range substantially defined as one logit the user ability to two and one-half logits above the user ability.

12. An adaptive training system for use with an adaptive testing tool, the system comprising:
    a user interface receptive of a field of application selection from a user;
    a plurality of task items stored in a data store, the plurality of task items organized by field of application and ranked by difficulty level; and
    an item selector operable to select an unfamiliar task item as a training task item based on the selected field of application and a user ability, wherein the user ability is a function of previous user performance relating to task items of the selected field of application, difficulty level of task items is defined in terms of logits, and said item selector is operable to select unfamiliar task items in a range substantially defined as one logit below the user ability to two and one-hall logits above the user ability.

13. The system of claim 12, further comprising an ability evaluation module operable to determine a level of user ability as a function of previous user performance relating to a plurality of task items, wherein the plurality of task items relate to the selected field of application.

14. The system of claim 13, wherein said ability evaluation module is operable to compute the user ability as a sum of average difficulty level of task items previously performed correctly by the user and a natural log of a quotient of a number of task items performed correctly by the user and a number of task items performed incorrectly by the user.

15. The system of claim 12, wherein said item selector is operable to select an easier, unfamiliar task item having a difficulty level below the user ability, and a more difficult, unfamiliar task item having a difficulty level above the user ability.

16. The system of claim 12, wherein said item selector is operable to select a missed task item as a training task item.

17. The system of claim 12, wherein at least one cut point is defined items of user ability as an indicator of minimum user proficiency level relating to a field of application, and wherein said item selector is operable to vary a total number of selected training items based on a comparison between the user ability and the defined cut point.

18. The system of claim 12, wherein said user interface is receptive of user performance information corresponding to results of a paper and pencil test.

19. The system of claim 12 comprising previous training session results organized by user and stored in memory operable with a data processing system, wherein said item selector has a learning management system operable to access said previous training session results and retrieve user performance information.

20. The system of claim 12 comprising tests results organized by user and stored in memory operable with a data processing system, wherein said item selector has a learning management system operable to access said test results and retrieve user performance information.

21. The system of claim 12, wherein an unfamiliar training task item corresponds to a task item not selected as a testing task item in a last testing procedure.

22. The system of claim 12, wherein an unfamiliar training task item corresponds to a task item not selected as a training task item in a last training session.

23. The system of claim 12, wherein said item selector is operable to select as training task items a plurality of unfamiliar task items having difficulty levels in a predefined range of difficulty relating to the user ability, thereby selecting at least one unfamiliar task item having a difficulty level less than the user ability, and at least one unfamiliar task item having a difficulty level higher than the user ability.

24. An adaptive training method for use with an adaptive testing tool, comprising:
    determining a user ability as a function of previous user performance relating to task items of a selected field of application, wherein a task items has a predefined difficulty level;
    defining a difficulty range for training task items on which to train a user, wherein the difficulty range relates to the user ability; and
    selecting a plurality of unfamiliar task items as training task items, wherein the unfamiliar task items have a difficulty level falling within the difficulty range, and said determining a user ability comprises computing the user ability as a sum of average difficulty level of task items performed correctly by the user and a natural log of a quotient of a number of task items performed correctly by the user and a number of task items performed incorrectly by the user.

25. The method of claim 24, wherein said selecting a plurality of unfamiliar training task items comprises selecting an easier, unfamiliar task item as a training task item and a more difficult, unfamiliar task item as a training task item, wherein the easier, unfamiliar task item has a difficulty level below the user ability, and the more difficult, unfamiliar task item has a difficulty level above the user ability.

26. The method of claim 24 comprising selecting a missed task item as a training task item.

27. The method of claim 24 comprising receiving a field of application selection.

28. The method of claim 24 comprising receiving previous user performance information.

29. The method of claim 24 comprising training a user on the selected training task items.

30. The method of claim 24 comprising recording a training session history.

31. The method of claim 24 comprising determining a total number of selected training task items based on a comparison between the user ability and a defined cut point, wherein at least one cut point is defined in terms of user ability as an indicator of minimum user proficiency level relating to a field of application.

32. An adaptive training method for use with an adaptive testing tool, comprising:
    determining a user ability as a function of previous user performance relating to task items of a selected fields of application, wherein a task items has a predefined difficulty level;

defining a difficulty range for training task items on which to train a user, wherein the difficulty range relates to the user ability;

selecting a plurality of unfamiliar task items, wherein the unfamiliar task items have a difficulty level falling within the difficulty range, difficulty level of task items is defined in terms of logits, and said defining a difficulty range for training task items comprises setting difficulty range limits substantially corresponding to one logit bellow the user ability to two and one-half above the user ability.

33. The method of claim 32, wherein said selecting a plurality of unfamiliar training task items comprises selecting an easier, unfamiliar task item as a training task item and a more difficult, unfamiliar task item as a training task item, wherein the easier, unfamiliar task item has a difficulty level below the user ability, and the more difficult, unfamiliar task item has a difficulty level above the user ability.

34. The method of claim 32, wherein said determining a user ability comprises computing the user ability as a sum of average difficulty level of task items performed correctly by the user and a natural log of a quotient of a number of task items performed correctly by the user and a number of task items performed incorrectly by the user.

35. The method of claim 32 comprising selecting a missed task item as a training task item.

36. The method of claim 32 comprising receiving a field of application selection.

37. The method of claim 32 comprising receiving previous user performance information.

38. The method of claim 32 comprising training a user on the selected training task items.

39. The method of claim 32 comprising recording a training session history.

40. The method of claim 32 comprising determining a total number of selected training task items based on a comparison between the user ability and a defined cut point, wherein at least one cut point is defined in terms of user ability as an indicator of minimum user proficiency level relating to a field of application.

41. An adaptive testing and training system, comprising:

a user interface receptive of a field of application selection from a user;

a plurality of task items organized by field of application, ranked by difficulty level, and stored in memory operable with a data processing system;

an adaptive testing module operable to select a task item as a testing task item based on the field of application selection and user performance relating to a previously selected testing task item; and an adaptive training module operable to select a plurality of unfamiliar training task items based on the selected field of application and a user ability, wherein the user ability is a function of selected testing task item difficulty in a most recent test, and wherein an unfamiliar training task item corresponds to a task item not selected as a testing task item in the most recent test, and not selected as a training task item in a most recent training session, and said adaptive training module is operable to compute the user ability as a sum of average difficulty level of task items performed correctly by the user and a natural log of a quotient of a number of task items performed correctly by the user and a number of task items performed incorrectly by the user.

42. The system of claim 41, wherein at least one cut point is defined in terms of user ability as an indicator of minimum user proficiency level relating to the field of application, and wherein said adaptive training tool is operable to vary a total number of selected training task items based on a comparison between the user ability and the defined cut point.

43. An adaptive testing and training system, comprising:

a user interface receptive of a field of application selection from a user;

a plurality of task items organized by field of application, ranked by difficulty level, and stored in memory operable with a data processing system;

an adaptive testing module operable to select a task item as a testing task item based on the field of application selection and user performance relating to a previously selected testing task item; and an adaptive training module operable to select a plurality of unfamiliar training task items based on the selected field of application and a user ability, wherein the user ability is a function of selected testing task item difficulty in a most recent test, and wherein an unfamiliar training task item corresponds to a task item not selected as a testing task item in the most recent test, and not selected as a training task item in a most recent training session, difficulty level of task items is defined in terms of logits, and said adaptive training module is operable to select the plurality of training task items according to a range of difficulty level substantially defined as one logit below the user ability to two and one-half logits above the user ability.

44. The system of claim 43, wherein said adaptive training module is operable to compute the user ability as a sum of average difficulty level of task items performed correctly by the user and a natural log of a quotient of a number of task items performed correctly by the user and a number of task items performed incorrectly by the user.

45. The system of claim 43, wherein at least one cut point is defined in terms of user ability as an indicator of minimum user proficiency level relating to the field of application, and wherein said adaptive training tool is operable to vary a total number of selected training task items based on a comparison between the user ability and the defined cut point.

* * * * *

UNITED STATES PATENT AND TRADEMARK OFFICE
CERTIFICATE OF CORRECTION

PATENT NO. : 6,925,601 B2
APPLICATION NO. : 10/230311
DATED : August 2, 2005
INVENTOR(S) : Gilbert Moore et al.

Page 1 of 1

It is certified that error appears in the above-identified patent and that said Letters Patent is hereby corrected as shown below:

<u>Column 7,</u>
Line 17, after "is" insert -- defined in --.
Line 19, after "logit" insert -- below --.
Line 36, "one-hall" should be -- one-half --.
Line 58, "items" should be -- in terms --.

<u>Column 8,</u>
Line 67, "fields" should be -- field --.

<u>Column 9,</u>
Line 6, after "items" insert -- as training task items --.
Line 12, "bellow" should be -- below --; and after "one-half" insert -- logits --.

Signed and Sealed this

Twentieth Day of June, 2006

JON W. DUDAS
*Director of the United States Patent and Trademark Office*